(12) United States Patent
Yamada et al.

(10) Patent No.: US 11,948,469 B2
(45) Date of Patent: Apr. 2, 2024

(54) INFORMATION PROCESSING APPARATUS

(71) Applicant: NTT DOCOMO, INC., Tokyo (JP)

(72) Inventors: Takefumi Yamada, Tokyo (JP);
Yuichiro Segawa, Tokyo (JP);
Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 378 days.

(21) Appl. No.: 17/312,571

(22) PCT Filed: Jan. 14, 2020

(86) PCT No.: PCT/JP2020/000867
§ 371 (c)(1),
(2) Date: Jun. 10, 2021

(87) PCT Pub. No.: WO2020/153171
PCT Pub. Date: Jul. 30, 2020

(65) Prior Publication Data
US 2021/0350717 A1 Nov. 11, 2021

(30) Foreign Application Priority Data

Jan. 22, 2019 (JP) .................................. 2019-008382

(51) Int. Cl.
*G08G 5/04* (2006.01)
*G08G 5/00* (2006.01)

(52) U.S. Cl.
CPC ........... *G08G 5/045* (2013.01); *G08G 5/0043* (2013.01); *G08G 5/0086* (2013.01); *G08G 5/0091* (2013.01)

(58) Field of Classification Search
CPC ...... G08G 5/00; G08G 5/0043; G08G 5/0069; G08G 5/0082; G08G 5/0086;
(Continued)

(56) References Cited

U.S. PATENT DOCUMENTS

2016/0035225 A1* 2/2016 Berckefeldt ......... G08G 5/0021
342/32
2019/0289512 A1* 9/2019 Kaneda .................... B64C 39/02
2020/0216193 A1* 7/2020 Muehlbauer ......... G05D 1/0808

FOREIGN PATENT DOCUMENTS

JP 2017130121 A 7/2017

OTHER PUBLICATIONS

NPL Search (Oct. 2, 2023).*
International Search Report issued in corresponding PCT Application No. PCT/JP2020/000867, dated Mar. 24, 2020, 4 pages.

* cited by examiner

*Primary Examiner* — Van T Trieu
(74) *Attorney, Agent, or Firm* — DILWORTH IP, LLC

(57) ABSTRACT

A flight information acquisition unit repeatedly acquires the respective flight status of a plurality of drones in flight. A flight irregularity determination unit determines whether or not the drones are flying in a manner deviated from a flight plan. When a flight status of a drone indicating flight deviated from the flight plan has been acquired, a first collision specification unit specifies the drone at risk of collision with a drone having that flight status. When a flight status indicating that there is a possibility of crash for a drone has been acquired, a flight status processing unit (such as a flight irregularity determination unit) sets a higher priority for processing based on the flight status acquired from that drone than for processing based on the flight status acquired from another drone.

8 Claims, 7 Drawing Sheets

(58) Field of Classification Search
CPC ........ G08G 5/0091; G08G 5/04; G08G 5/045; G05D 1/00; G05D 1/0022; G05D 1/08; B64D 45/00

See application file for complete search history.

| DRONE ID | FLIGHT TIME | FLIGHT POSITION | FLIGHT DIRECTION | FLIGHT ALTITUDE | FLIGHT SPEED |
|---|---|---|---|---|---|
| D001 | . . . | . . . | . . . | . . . | . . . |
|  | . . . | . . . | . . . | . . . | . . . |
|  | . . . | . . . | . . . | . . . | . . . |
| D002 | . . . | . . . | . . . | . . . | . . . |
|  | . . . | . . . | . . . | . . . | . . . |
|  | . . . | . . . | . . . | . . . | . . . |
| . . . | . . . | . . . | . . . | . . . | . . . |

| DRONE ID | FLIGHT AIRSPACE (CELL ID) | PLANNED FLIGHT PERIOD |
|---|---|---|
| D001 | R11(C0101,C0201, · · ,C2001) | K11(T111~T112) |
|  | R12(C2001,C2002, · · ,C2020) | K12(T121~T122) |
|  | R13(C2020,C2120, · · ,C4320) | K13(T131~T132) |
| D002 | A21(Cxxxx, · · ,Cxxxx) | T21~T22 |

| DISTANCE BETWEEN DRONES | PRIORITY |
|---|---|
| LESS THAN Th11 | HIGH |
| AT LEAST Th11 AND LESS THAN Th12 | MEDIUM |
| AT LEAST Th12 AND LESS THAN Th13 | LOW |

Fig. 9

| PREDICTED TIME TO COLLISION | PRIORITY |
|---|---|
| LESS THAN Th21 | HIGH |
| AT LEAST Th21 AND LESS THAN Th22 | MEDIUM |
| AT LEAST Th22 AND LESS THAN Th23 | LOW |

Fig. 10

| SIZE OF AREA WHERE DRONE IS EXPEXTED TO FALL | PRIORITY |
|---|---|
| LESS THAN Th31 | LOW |
| AT LEAST Th31 AND LESS THAN Th32 | MEDIUM |
| AT LEAST Th32 | HIGH |

Fig. 11

| LAND TYPE | POPULATION DENSITY | PRIORITY |
|---|---|---|
| AGRICULTURAL LAND OR FOREST LAND | LOW | LOW |
| INDUSTRIAL LAND | MEDIUM | MEDIUM |
| RESIDENTIAL LAND OR COMMERCIAL LAND | HIGH | HIGH |

Fig. 12

| WIND SPEED | PRIORITY |
|---|---|
| LESS THAN Th41 | LOW |
| AT LEAST Th41 AND LESS THAN Th42 | MEDIUM |
| AT LEAST Th42 | HIGH |

Fig. 13A

| PRECIPITATION AMOUNT | PRIORITY |
|---|---|
| LESS THAN Th51 | LOW |
| AT LEAST Th51 AND LESS THAN Th52 | MEDIUM |
| AT LEAST Th52 | HIGH |

Fig. 13B

INFORMATION PROCESSING APPARATUS

TECHNICAL FIELD

The present invention relates to a technique for supporting safe flight of an aerial vehicle.

BACKGROUND ART

Japanese Patent Application No. JP-2017-130121A discloses a technique for, in an aircraft system in which a server collects planned trajectories of each aircraft to avoid a collision, reducing the load of the server by causing each aircraft to generate a self-planned trajectory that does not interfere with the planned trajectory of other aircraft(s).

SUMMARY OF INVENTION

There are cases where a risk of crash (falling to the ground or the like) can be detected from information including an aerial vehicle's own position or the like that an aerial vehicle such as a drone has transmitted during flight. In that case, it is important that processing for avoiding the crash (such as sending a warning to the operator) is performed as quickly as possible.

Accordingly, an object of the present invention is to avoid crashing of an aerial vehicle easily when there is a possibility of crashing.

To achieve the above-described object, the present invention provides an information processing apparatus including: an acquisition unit configured to acquire a respective flight status from a plurality of aerial vehicles in flight repeatedly; and an output unit that executes processing based on the acquired flight status and outputs results of that processing, and when the acquired flight status indicates that there is a risk of crashing the aerial vehicle, executes processing based on the flight status acquired from that aerial vehicle with higher priority than processing based on the flight status acquired from other aerial vehicle.

According to the present invention, it is possible to easily avoid crashing of an aerial vehicle when there is the possibility of crashing.

BRIEF DESCRIPTION OF DRAWINGS

FIG. 9 is a diagram showing an example of a priority table in accordance to the present invention.

FIG. 10 is a diagram showing an example of a priority table of a modification in accordance to the present invention.

FIG. 11 is a diagram showing an example of a priority table of a modification in accordance to the present invention.

FIG. 12 is a diagram showing an example of a priority table of a modification in accordance to the present invention.

FIGS. 13A and 13B are diagrams showing an example of priority tables of a modification in accordance to the present invention.

DETAILED DESCRIPTION

1. Embodiment

Figure 1:
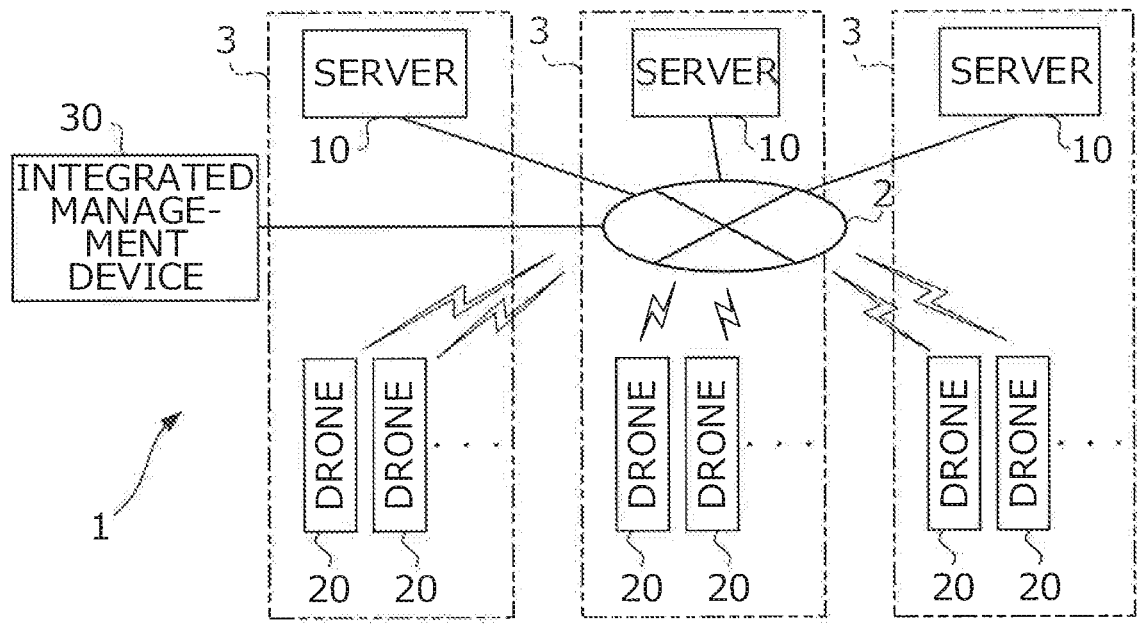
FIG. 1 is a diagram showing an example of the overall configuration of an operation management support system according to the present invention.

FIG. 1 is a diagram showing an example of the overall configuration of operation management support system 1 according to an embodiment. Operation management support system 1 is a system that supports operation management of aerial vehicle. Operation management refers to managing flight (that is, flight operation) according to a flight plan of an aerial vehicle such as a drone. In the present embodiment, it is assumed that there are a plurality of businesses 3 that perform operation management, and each business 3 manages flight operation of respective aerial vehicle under its control.

Operation management support system 1 includes network 2, a plurality of server devices 10, a plurality of drones 20, and integrated management device 30. Network 2 is a communications system including a mobile communications network, the Internet, and the like, and relays the exchange of data between devices that access that system. Network 2 is accessed by server devices 10 and integrated management device 30 through wired communications (or wireless communications), and by drones 20 through wireless communication.

In the present embodiment, drones 20 are rotary blade-type aerial vehicle that fly by rotating one or more rotary blades, and are used in various applications such as imaging, inspection, spraying, security, and transportation. Drones 20 fly according to operation by an operator. Operation by the operator is performed by using a 'propo' (a controller that performs proportional control), a personal computer for giving flight instructions (a device that continuously outputs flight instructions that have been set), or the like.

Since drones 20 are used in operation management for the purpose of safe flight and the like, information (flight information) indicating flight status, including at least their own aerial vehicle position during flight, is periodically transmitted to server device 10 controlling that aerial vehicle. Server device 10 is installed by business 3, and performs processing for managing flight of drones 20 under control of business 3 and that device, based on transmitted flight information and the flight plan of each drone 20. Details of this processing will be described later.

Integrated management device 30 gathers information (flight plans, flight information, and the like) handled by the plurality of server devices 10, and performs processing for smooth information sharing among the devices and the like. For example, flight plans of respective drones 20 can be shared more efficiently by being once collected in integrated management device 30 and then distributed to each server device 10, rather than by server devices 10 sharing the flight plans with each other. However, not all information sharing is performed through integrated management device 30. Information sharing directly performed between server devices 10 will also be described later in detail.

Figure 2:
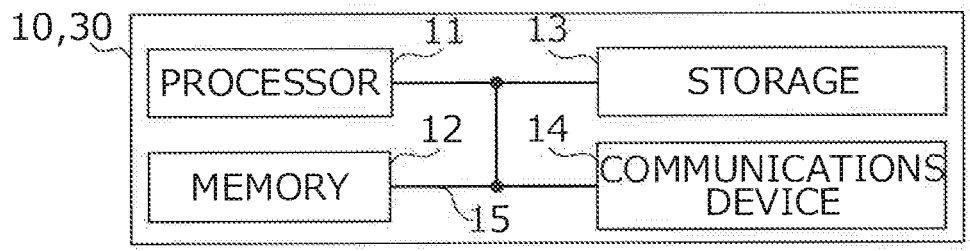
FIG. 2 is a diagram showing an example of a hardware configuration of a server device and an integrated management device in accordance to the present invention.

FIG. 2 is a diagram showing an example of a hardware configuration of server device 10 and integrated management device 30. Server device 10 and integrated management device 30 may be configured, physically, as computer devices that include processor 11, memory 12, storage 13, communications device 14, bus 15, and the like. Note that in the following description, the term "device" used here can be replaced with "circuit", "device", "unit", or the like.

Also, one or more of each device may be included, and some devices may be omitted. Processor 11 controls the computer as a whole by running an operating system, for example. Processor 11 may be constituted by a central processing unit (CPU) including an interface with peripheral devices, a control device, an arithmetic device, registers, and the like.

For example, a baseband signal processing unit or the like may be realized by processor 11. Also, processor 11 reads a program (program code), a software module, data, and the like into memory 12 from at least one of storage 13 and communications device 14, and executes various processing according to these. A program that causes a computer to execute at least some of the operations described in the above embodiment is used as the program.

Although the various processing described above is described as executed by one processor 11, the various processing may be executed simultaneously or sequentially by two or more processors 11. Processor 11 may be implemented using one or more chips. Note that a program may be transmitted from a network over an electrical communications line. Memory 12 is a computer-readable recording medium.

Memory 12 may be constituted by at least one of ROM (Read Only Memory), EPROM (Erasable Programmable ROM), EEPROM (Electrically Erasable Programmable ROM), RAM (Random Access Memory), and so on, for example. Memory 12 may be called a "register", "cache", "main memory" (a main storage device), or the like. Memory 12 can store programs (program code) that can be executed to implement a wireless communications method according to an embodiment of the present disclosure, software modules, and the like.

Storage 13 is a computer-readable recording medium, and for example, may be constituted by at least one of an optical disk such as a CD-ROM (Compact Disc ROM), a hard disk drive, a flexible disk, a magneto-optical disk (for example, a compact disk, a digital versatile disk, or a Blu-ray (registered trademark) disk), a smartcard, flash memory (for example, a card, a stick, or a key drive), a Floppy (registered trademark) disk, a magnetic strip, and the like.

Storage 13 may be called an auxiliary storage device. The above-mentioned storage medium may be a database, a server, or another appropriate medium including memory 12 and/or storage 13, for example. Communications device 14 is hardware for communicating between computers over a wired and/or wireless network (a transmitting/receiving device).

For example, the transmitting/receiving antenna, amplifier unit, transmitting/receiving unit, transmission path interface, and the like mentioned above may be realized by communications device 14. The transmitting/receiving unit may be implemented by physically or logically separating the transmission unit and the receiving unit. Further, each device such as processor 11 and memory 12 is configured to be connected by bus 15 for communicating information. Bus 15 may be configured using a single bus, or may be configured by using a different bus for each device.

Figure 3:
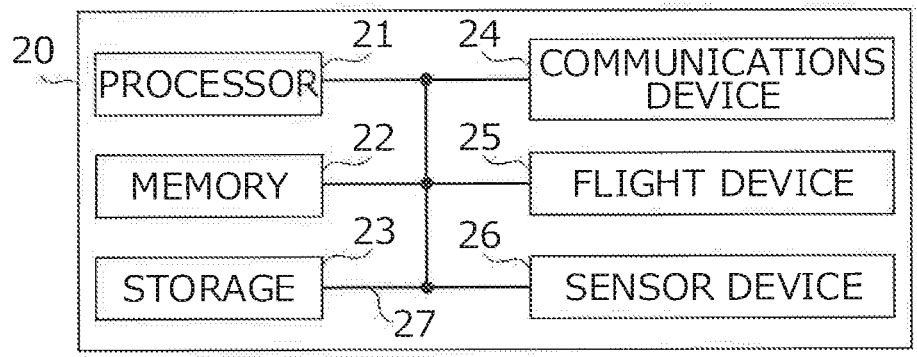
FIG. 3 is a diagram showing an example of a hardware configuration of a drone in accordance to the present invention.

FIG. 3 is a diagram showing an example of a hardware configuration of drone 20. Physically, drone 20 may be configured as a computer device including processor 21, memory 22, storage 23, communications device 24, flight device 25, sensor device 26, bus 27, and the like. Among these, hardware having the same name as that shown in FIG. 2 is the same kind of hardware, although having different performance, specifications, and the like.

Communications device 24, in addition to communicating with network 2, has a function of communicating with the propo (for example, a function of wireless communications by radio waves in the 2.4 GHz band). Flight device 25 is a device that includes a motor, a rotor, and the like, and gives drone 20 to a capability of flying. Flight device 25 can move drone 20 in any direction in the air, or can make drone 20 stationary (i.e., hovering).

Sensor device 26 is a device having a sensor group that acquires information necessary for flight control. Sensor device 26 includes, for example, a position sensor that measures the position (latitude and longitude) of the host device, a direction sensor that measures the direction the host device is facing (a forward direction is defined for the drone, and the forward direction is the direction the host device is facing), and an altitude sensor that measures the altitude of the host device. Further, sensor device 26 includes a speed sensor that measures the speed of the host device and an inertial measurement sensor (IMU (Inertial Measurement Unit)) that measures the angular velocity on three axes and the acceleration in three directions.

Each function in each device included in operation management support system 1 is realized, by causing predetermined software (programs) to be loaded on hardware such as respective processors and memory, by a processor performing computation to control communications by the respective communications devices, and to control at least one of reading and writing of data in memory and storage.

Figure 4:
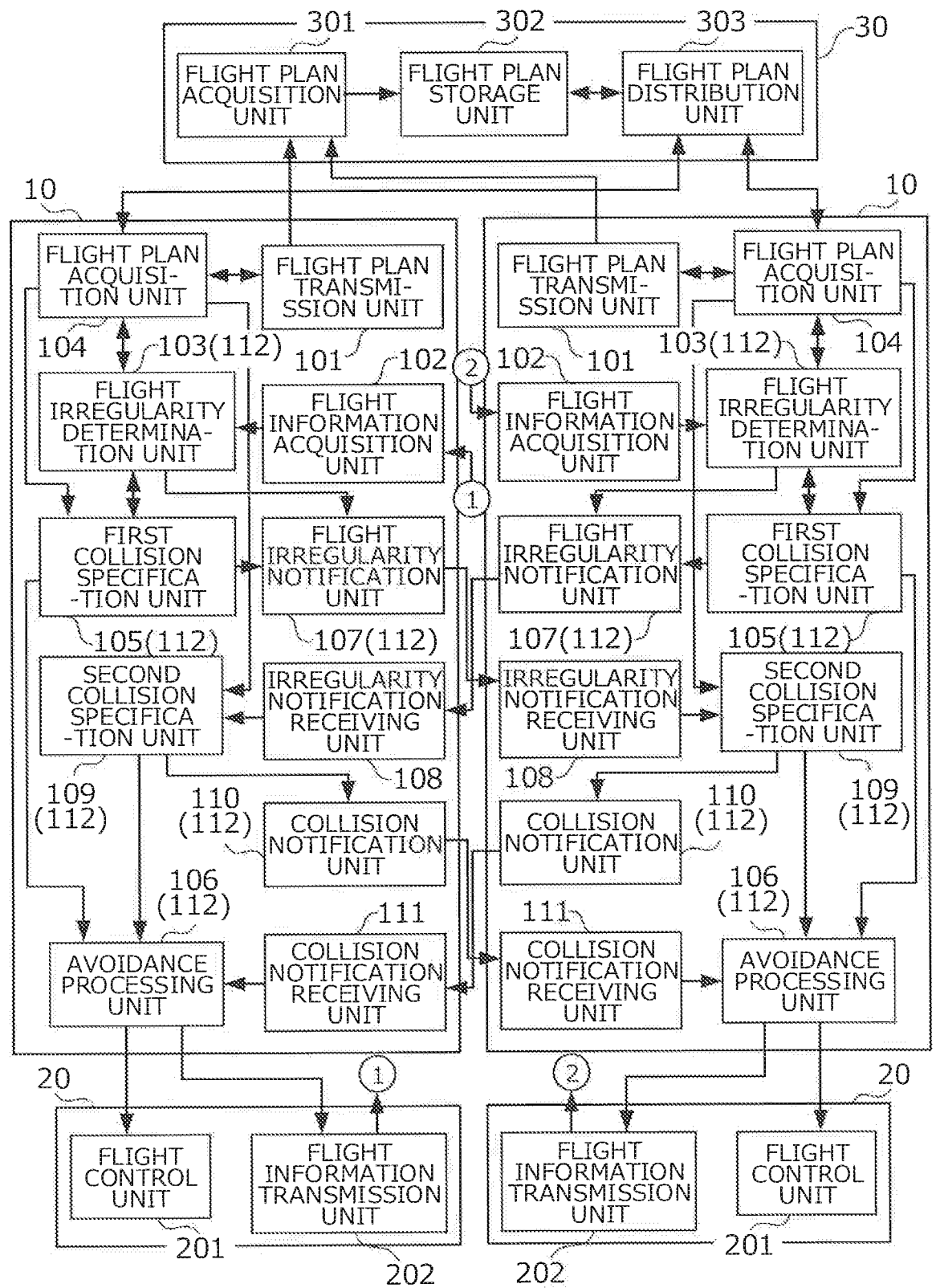
FIG. 4 is a diagram showing a functional configuration realized by each device in according to the present invention.

FIG. 4 is a diagram showing a functional configuration realized by each device. In FIG. 4, two combinations of server device 10 and drone 20 are shown, and these are combinations of drones 20 under control of different operation management businesses and server devices 10 used to control over drones 20 by the respective operation management businesses. Also, because each server device 10 and each drone 20 included in operation management support system 1 have the functions shown in FIG. 4, other server devices 10 and drones 20 are not shown.

In operation management support system 1, a device ID that identifies each server device 10 and a drone ID that identifies each drone 20 are defined. By assigning those IDs and the current time to data exchanged between devices, the transmission source of information, the target of information (for example, which drone 20 a flight plan belongs to), the transmission time, and the like are identified. Note that although various information such as flight plans and flight information is converted into data and exchanged, in the following description, transmitting data also means simply transmitting information indicated by that data.

Server device 10 includes flight plan transmission unit 101, flight information acquisition unit 102, flight irregularity determination unit 103, flight plan acquisition unit 104, first collision specification unit 105, avoidance processing unit 106, flight irregularity notification unit 107, irregularity notification receiving unit 108, second collision specification unit 109, collision notification unit 110, and collision notification receiving unit 111. Drone 20 includes flight control unit 201 and flight information transmission unit 202. Integrated management device 30 includes flight plan acquisition unit 301, flight plan storage unit 302, and flight plan distribution unit 303.

Flight plan transmission unit 101 of server device 10 transmits the flight plan of drone 20 under control of this server device (under control of the operation management business who uses this server device) to integrated management device 30. The flight plan of drone 20 is created by the operation management business having a control over drone 20, converted into data, and stored in server device 10. The flight plan is, for example, information indicating a flight airspace where drone 20 will fly and a time zone when flight through that flight airspace will occur. The flight plan may be a plan for the current day, or may be a plan for the next day or later. Flight plan transmission unit 101 transmits stored flight plan data to integrated management device 30.

Flight plan acquisition unit 301 of integrated management apparatus 30 acquires the flight plan indicated by the transmitted flight plan data, that is, the flight plan of drone 20 to be supported by flight management support system 1. Flight plan acquisition unit 301 supplies the acquired flight plan to flight plan storage unit 302. Flight plan storage unit 302 stores the supplied flight plan in association with a drone ID of drone 20 subject to the plan.

Flight control unit 201 of drone 20 controls flight of that aerial vehicle by using the measurement results of each sensor included in sensor device 26. Flight control unit 201, for example, performs flight control so as to fly on a flight route instructed by an operator using a propo or the like. Flight information transmission unit 202 of drone 20 transmits flight information indicating the flight status of that aerial vehicle to server device 10 having a control over that aerial vehicle at regular intervals.

Flight information transmission unit 202 generates flight information data based on the measurement results of each sensor included in sensor device 26 at predetermined time intervals, and transmits the flight information data to server device 10. Flight information acquisition unit 102 of server device 10 acquires the flight information transmitted from drone 20 at regular intervals as described above. By acquiring this flight information, flight information acquisition unit 102 repeatedly acquires the flight status of each of the plurality of drones 20 in flight (drones 20 belonging to a group under control of that server device).

Here, for server device 10, a group of drones 20 under control of that server device is called a "control group", and a group of drones 20 under control of another server device 10 is called a "non-control group". That is, flight information acquisition unit 102 repeatedly acquires the flight status of drones 20 belonging to the control group. Flight information acquisition unit 102 is an example of an "acquisition unit" of the present invention.

Figures 5, 6A, 6B:
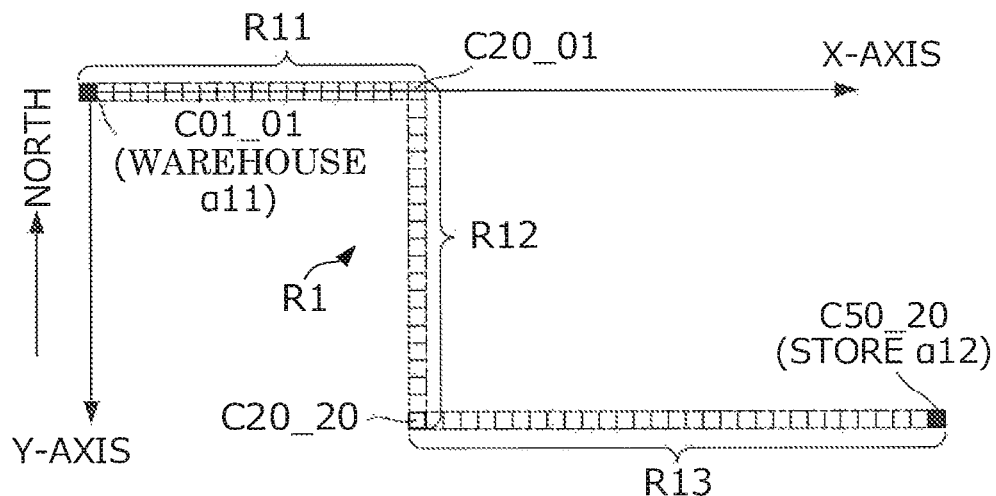
FIG. 5 is a diagram showing an example of flight information in accordance to the present invention.
FIGS. 6A and 6B are diagrams showing an example of flight plans in accordance to the present invention.

FIG. 5 is a diagram showing an example of flight information. The example in FIG. 5 shows flight information that includes a drone ID, flight time (measurement time of each item of information), flight position (for example, latitude and longitude), flight direction (for example, a numerical value indicating the direction in 360 degrees), flight altitude (for example, the altitude above sea level) and flight speed. Since the flight information is repeatedly acquired, a plurality of flight times and the like are associated with one drone ID.

Flight information acquisition unit 102 supplies the acquired flight information of drone 20 belonging to the control group to flight irregularity determination unit 103. Flight irregularity determination unit 103 determines whether or not drone 20 belonging to the control group is flying in a manner deviated from the flight plan. Flight irregularity determination unit 103 requests from flight plan acquisition unit 104, for example, at the beginning of the day, the flight plans of all drones 20 planned to fly on that day and belonging to the control group.

Flight plan acquisition unit 104 acquires the requested flight plans, that is, the flight plans of drones 20 planned to fly on that day and belonging to the control group. Flight plan acquisition unit 104 acquires the requested flight plans by reading the corresponding flight plans from flight plan transmission unit 101 of that server device. Flight plans will be described with reference to FIG. 6.

FIG. 6 shows an example of flight plans. In FIG. 6A, the flight airspace where drone 20 with the drone ID "D001" is planned to fly is shown. In operation management support system 1, the flyable airspace where drones 20 can fly is predetermined like a road network. Flyable airspace is airspace for which the necessary permission for flight has been received, and in some cases may include airspace that does not require permission.

In the present embodiment, the flyable airspace is represented by a cubic space (hereinafter referred to as a "cell") that is spread without any gaps, and each cell is provided with a cell ID that identifies each cell. In the present embodiment, for ease of understanding, the altitude of each cell is constant, and the x-y coordinates of each cell and the cell ID are shown associated with each other (for example, a cell whose x-y coordinates are (x10, y15) is given a cell ID of C10_15).

FIG. 6A shows flight airspace R1 spanning from "warehouse α11" to "store α12". Flight airspace R1 includes: divided airspace (airspace obtained by dividing the flight airspace) R11 from cell C01_01, which is the departure point of drone 20, through the cells adjacent in the x axis positive direction, and to cell C20_01; divided airspace R12 from cell C20_01, through the adjacent cells in the y axis positive direction, and to cell C20_20; and divided airspace R13 from cell C20_20, through the adjacent cells in the x axis positive direction, and to cell C50_20, which is the destination cell.

FIG. 6B shows, as the flight plan of drone 20 having drone ID "D001", a cell ID indicating the flight airspace, and a planned flight period in that flight airspace. For example, in the case of above-mentioned drone 20, a cell ID and a planned flight period are shown for each divided airspace. For example, for divided airspace R11, period K11 from planned time T111 to enter divided airspace R11 until planned time T112 to leave divided airspace R11 is shown.

Also, a flight plan for flying in flight airspace A21 from time T21 to T22 is shown for drone 20 having drone ID "D002". This drone 20 will, for example, photograph a certain site from above, and flight airspace A21 is represented by a set of cell IDs of cells located above that site. In this example, what sort of route to fly in flight airspace A21 is not decided by the plan, but the flight plan may be decided in detail so as to also include what sort of route to fly.

Flight plan acquisition unit 104 supplies the acquired flight plan of drone 20 belonging to the control group to flight irregularity determination unit 103. Flight irregularity determination unit 103 compares the supplied flight plan with the flight status indicated by the supplied flight information, and for example in a case where that drone 20 flies at a position separated by at least a predetermined distance from the flight route planned in the flight plan, determines that drone 20 is flying in a manner deviated from the flight plan. Flight irregularity determination unit 103 determines that drone 20 is flying in a manner deviated from the flight plan, for example, when drone 20 is separated from the flight airspace indicated by the flight plan by two cells or more.

Also, flight irregularity determination unit 103 determines that drone 20 is flying in a manner deviated from the flight plan in a case where although drone 20 is flying on the flight route planned in the flight plan, drone 20 is flying at a time separated by at least a predetermined time interval from the planned flight time zone. Flight irregularity determination unit 103 determines that drone 20 is flying in a manner deviated from the flight plan, for example, when drone 20 is separated from the planned flight period indicated by the flight plan by five minutes or more. Note that the above-described distance of two cells and the above-described time interval of five minutes are examples, and other distances and time intervals may be used.

Here, in this embodiment, as shown in FIG. 1, each server device 10 has a group to which drone 20 belongs. Flight plan acquisition unit 104 acquires not only the flight plan of drones 20 belonging to the control group under control of that server device, but also the flight plan of drones 20 belonging to a non-control group under control of another server device 10 and planned to fly that day. Flight plan acquisition unit 104 transmits, to integrated management device 30, request data that requests the flight plan of drones 20 that belong to a relevant non-control group.

Flight plan distribution unit 303 of integrated management device 30 reads out the flight plan requested by the transmitted request data from flight plan storage unit 302 and distributes this flight plan to the requesting server device 10. Flight plan acquisition unit 104 acquires the distributed flight plan as the flight plan of drone 20 belonging to the non-control group, and supplies this flight plan to first collision identification unit 105. Note that flight plan acquisition unit 104 also may directly acquire the flight plan of drone 20 belonging to the non-control group from another server device 10.

Flight irregularity determination unit 103 supplies flight information of drone 20 that is determined to be flying in a manner deviated from the flight plan to first collision specification unit 105. In a case where flight information has been supplied from flight irregularity determining unit 103, that is, when the flight status of drone 20 indicating flight deviated from the flight plan has been acquired, first collision specification unit 105 specifies, from among drones 20 belonging to the control group, drone 20 at risk of collision with drone 20 whose flight status indicates flight deviated from the flight plan.

First collision specification unit 105, for example, specifies drone 20 at risk of collision based on the flight plan of drone 20 belonging to the control group acquired by flight plan acquisition unit 104. In the following description, when simply stating "drone 20 at risk of collision", this means drone 20 at risk of collision with drone 20 that is performing irregular flight.

Note that when two or more drones 20 are performing irregular flight, it is possible that drone 20 at risk of collision is itself performing irregular flight. Also, in the above example drone 20 that is performing irregular flight and drone 20 at risk of collision both belong to the control group, but there may also be cases where these belong to a non-control group (this case will be described later).

First collision specification unit 105, for example, specifies drone 20 at risk of collision based on the distance between the position of drone 20 included in the supplied flight status (drone 20 that is performing irregular flight) and the current position of drone 20 in the acquired flight plan. Commonly, when the flying positions of two drones approach a certain distance or more, the possibility of colliding increases. Therefore, first collision specification unit 105 specifies drone 20 whose distance from drone 20 that is performing irregular flight is less than a threshold value as drone 20 at risk of collision.

Here, "at risk of collision" means a state in which the possibility of colliding has increased to at least a predetermined level. For example, even in a state where drones are 100 meters or more apart from each other, the possibility of colliding is not zero if they continue to fly, but the possibility is extremely small, so it is not determined that there is a possibility of colliding. On the other hand, when the distance between the drones approaches a certain distance (a distance less than the above-mentioned threshold value), the possibility of colliding certainly increases, depending on the flight direction and the flight speed. Therefore, in such a case, first collision specification unit 105 specifies drone 20 at risk of collision.

When first collision specification unit 105 specifies drone 20 at risk of collision, first collision specification unit 105 notifies avoidance processing unit 106 of the specified drone 20 and drone 20 that is performing irregular flight. When drone 20 belonging to the control group has been specified as being at risk of collision, avoidance processing unit 106 performs processing (avoidance processing) for avoiding that collision. As the avoidance processing, for example, avoidance processing unit 106 performs processing that instructs drone 20 at risk of collision with drone 20 that is performing irregular flight to stop for a certain time interval.

As the avoidance processing, for example, avoidance processing unit 106 performs processing that instructs drone 20 at risk of collision with drone 20 that is performing irregular flight to stop for a certain time interval. Also, as the avoidance processing, avoidance processing unit 106 may perform processing that instructs to change the flight route of drone 20 to a flight route that allows a collision to be avoided. Also, drone 20 that is performing irregular flight may belong to the control group.

In this case, as the avoidance processing, avoidance processing unit 106 may also perform processing that gives the same instruction to drone 20 that is performing irregular flight. As the avoidance processing, avoidance processing unit 106 performs processing that generates instruction data that indicates each of the above instructions, and processing that transmits the generated instruction data to drone 20 that is the instruction target (that is, processing that outputs the instruction data). When receiving the instruction data, flight control unit 201 of drone 20 that is the instruction target controls flight of that aerial vehicle according to the instructions indicated by the instruction data.

Note that the transmission destination (output destination) of the instruction data is not limited to drone 20, and may be, for example, a propo or personal computer or the like used by an operator. In that case, a propo, a personal computer, or the like displays the instructions indicated by the instruction data, and the operator views this display and performs flight control according to the instructions. By performing the avoidance processing in this manner, it is possible to prevent drone 20 that is performing irregular flight from colliding with drone 20 belonging to the same control group.

Also, first collision specification unit 105, from among drones 20 belonging to non-control groups, specifies drone 20 at risk of collision with drone 20 that is performing irregular flight based on the flight plans of drones 20 belonging to the non-control groups acquired by flight plan acquisition unit 104. First collision specification unit 105, for example, with the same method as in the case where drone 20 belonging to the control group is the target (a method using the distance between drones 20), specifies drone 20 at risk of collision using drones 20 belonging to non-control groups as the target.

First collision specification unit 105 gives notification to avoidance processing unit 106 also in a case where drone 20 belonging to a non-control group is specified as drone 20 at risk of collision. Since avoidance processing unit 106 cannot instruct drone 20 belonging to a non-control group, avoidance processing unit 106 performs avoidance processing that instructs drone 20 that is performing irregular flight (that is, drone 20 belonging to the control group) to perform at least one of the above-described stoppage or changing of the flight route.

Flight irregularity determination unit 103 also supplies flight information of drone 20 that is performing irregular flight to flight irregularity notification unit 107. Flight irregularity notification unit 107 transmits the supplied flight information to other server devices 10, and thus notification of the flight status of drone 20 that is performing irregular flight indicated by the transmitted flight information is given to all other server devices 10.

Next is a description of functions of server device 10 that receives notification of the flight status. Irregularity notification receiving unit 108 of server device 10 that is the notification destination, by receiving the transmitted flight information, receives notification of the flight status of drone 20 that is performing irregular flight irregularity notification receiving unit 108 supplies the flight information received as notification of the flight status to second collision specification unit 109 of that server device.

When notification of the flight status of drone 20 that is performing irregular flight is received from another server device 10, second collision specification unit 109 specifies drone 20 at risk of collision with drone 20 indicated in the notification and belonging to the group under control of that server device. Flight plan acquisition unit 104 of that server device supplies, among the acquired flight plans, the flight plan of drone 20 belonging to the group under control of that server device to second collision specification unit 109.

Second collision specification unit 109, based on the supplied flight information and flight plan, for example, with the same method as first collision specification unit 105 (a method using the distance between drones 20), specifies drone 20 at risk of collision, using drone 20 that is performing irregular flight indicated in the notification and drone 20 belonging to the control group as the target.

When second collision specification unit 109 specifies drone 20 at risk of collision from drones 20 belonging to the control group, notification of the specified drone 20 is given to avoidance processing unit 106 of that server device. When avoidance processing unit 106 receives notification of drone 20 at risk of collision, avoidance processing unit 106 performs the avoidance processing. The avoidance processing performed by avoidance processing unit 106 is the same as the above-described avoidance processing (stop instruction, flight route change instruction, and the like). Second collision specification unit 109 gives notification of the specified drone 20 and drone 20 that is performing irregular flight to collision notification unit 110.

When notification of drone 20 that is performing irregular flight is received, that is, when drone 20 at risk of collision and belonging to the control group has been specified by second collision specification unit 109, collision notification unit 110 gives notification of specified drone 20 to server device 10 that is the notification source of the flight status indicating flight deviated from the flight plan. Collision notification unit 110 performs the above notification by transmitting the flight information indicating the flight status of the specified drone 20 to the above-described server device 10 that is the notification source.

Next is a return to description of server apparatus 10 that is the notification source of the flight information that indicates the flight status of drone 20 that is performing irregular flight. Collision notification receiving unit 111 of server device 10 that is the notification source receives the transmitted flight information, and thus receives notification of the flight status of drone 20 that is performing irregular flight (drone 20 belonging to the control group) and drone 20 at risk of collision (drone 20 belonging to a non-control group). Notification by collision notification unit 110 continues while specification by second collision specification unit 109 is being performed (that is, while the possibility of collision remains).

Continuously during that period, collision notification receiving unit 111 repeatedly acquires the flight status of drone 20 at risk of collision. Collision notification receiving unit 111 is an example of an "acquisition unit" in the present invention. Collision notification receiving unit 111 supplies the flight information received as the flight status notification to avoidance processing unit 106. The supplied flight information indicates that there is a possibility of colliding with drone 20 belonging to a non-control group in a case where drone 20 belong to the control group is performing irregular flight.

Drone 20 belonging to a non-control group may be specified also by first collision specification unit 105 as drone 20 at risk of collision, but this specification is not necessarily performed. For example, in a case where the flight plan of drone 20 belonging to a non-control group is changed on the same day and the changed flight plan has not been distributed, first collision specification unit 105 uses the old flight plan therefore it is not possible to correctly specify drone 20 at risk of collision. In this case, server device 10 that has a control over drone 20 whose flight plan has been changed on that day can acquire a new flight plan, and thus it is possible to correctly specify drone 20 at risk of collision.

Therefore, when notification of the flight status of drone 20 at risk of collision with drone 20 belonging to the control group is given from another server device 10, even if drone 20 at risk of collision has been specified by first collision specification unit 105, avoidance processing unit 106 performs avoidance processing of drone 20 (drone 20 belonging to the control group and performing irregular flight) at risk of collision with drone 20 (drone 20 belonging to a non-control group) having the flight status for which notification is given. By performing this avoidance processing, it is possible to prevent a collision from occurring because it is not possible to correctly specify drone 20 at risk of collision for the reasons described above.

The specification results that serve as the basis of the avoidance processing, that is, the specification results of drone 20 at risk of collision, are results themselves indicating drone 20 at risk of collision. The reason for this is that when drones 20 collide with each other, there is a high probability that these will break or lose balance and fall. Further, as the number of drones 20 flying increases, the number of drones 20 performing irregular flight also increases, and along with that increase, the load of processing to determine flight irregularity, processing to specify drone 20 at risk of collision, processing to give notifications regarding those, and avoidance processing increases.

As the processing load increases, the time required for processing also increases, so the avoidance processing is more likely to be delayed, and as a result, a situation easily occurs in which crashing of drone 20 cannot be avoided. In order to avoid such a situation, server device 10 preferentially performs processing for drone 20 at risk of crash. The processing described here is performed by flight irregularity determination unit 103, first collision specification unit 105, avoidance processing unit 106, flight irregularity notification unit 107, second collision specification unit 109, and collision notification unit 110.

For example, flight irregularity determination unit 103 determines whether or not flight irregularity is being performed based on the flight status acquired by flight information acquisition unit 102, and first collision specification unit 105 specifies drone 20 at risk of collision based on the results of that determination. Also, second collision specification unit 109 specifies drone 20 at risk of collision based on the flight status acquired by collision notification receiving unit 111.

Also, avoidance processing unit 106 performs avoidance processing based on the results of that specification, and flight irregularity notification unit 107 and collision notification unit 110 perform notification processing based on the above-described determination results or specification results. As described above, each of these units executes processing based on the repeatedly acquired flight status (including not only processing based directly on the flight status but also processing based indirectly on the flight status). Hereinafter, each of these units is also referred to as flight status processing unit 112.

When flight status processing unit 112, in both cases, executes processing based on the flight status, flight status processing unit 112 outputs the results of that processing. For example, avoidance processing unit 106 outputs (transmits) instruction data indicating an instruction for avoiding danger. Further, flight irregularity determination unit 103, first collision specification unit 105, and second collision specification unit 109 output (supply) the determination results or the specification results to each of the following units. Also, flight irregularity notification unit 107 and collision notification unit 110 output (transmit) flight information indicating the flight status to be given in the notification. Each flight status processing unit 112 is an example of an "output unit" in the present invention.

When a flight status indicating that there is a risk of crashing of drone 20 (hereinafter referred to as "warning status") has been acquired, flight status processing unit 112 sets a higher priority for processing based on the flight status acquired from drone 20 for which warning status has been acquired than for processing based on the flight status acquired from drone 20 for which warning status has not been acquired. Warning status for a certain drone 20 (flight status indicating that there is a possibility of crashing) means, for example, a flight status indicating that there is a possibility of contact with drone 20 other than the certain drone 20.

Therefore, when specification has been performed by first collision specification unit 105 and second collision specification unit 109, the warning status of drone 20 that is performing irregular flight and the specified drone 20 has been acquired. Therefore, when respective specification has been performed, first collision specification unit 105 and second collision specification unit 109 determine that the warning status has been acquired. Also, the respective units (avoidance processing unit 106, flight irregularity notification unit 107, and collision notification unit 110) to which the specification results of both specification units have been supplied determine that the warning status has been acquired in a case where specification results of both specification units have been supplied.

Also, first collision specification unit 105 supplies its own specification results to flight irregularity determination unit 103. Flight irregularity determination unit 103 determines that the warning status has been acquired when these specification results have been supplied. When the warning status has been acquired as described above, in the present embodiment, flight status processing unit 112 executes processing for which the priority is high (processing based on the flight status acquired from drone 20 for which the warning status has been acquired) before executing processing for which the priority is low (processing based on the flight status acquired from drone 20 for which the warning status has not been acquired).

For example, when it is determined that the warning status has been acquired, flight irregularity determination unit 103 subsequently performs determination of flight irregularity regarding drone 20 for which the warning status is acquired and belonging to the control group, with priority over other drones 20 (drones 20 for which the warning status has not been acquired). For example, in a case where flight status with a higher priority is acquired after flight status with a lower priority, flight irregularity determination unit 103 first advances the determination processing based on the acquired flight status.

However, at the point in time when the flight status with a higher priority is acquired, flight irregularity determination unit 103 interrupts the determination processing up to then, and starts the determination processing based on the flight status with a higher priority. Then, after the determination processing based on the flight status with a higher priority is finished, flight irregularity determination unit 103 resumes the determination processing based on the flight status with a lower priority. Note that flight irregularity determination unit 103 also may wait until the flight status with a higher priority is acquired, without starting the determination processing based on the flight status with a lower priority.

Second collision specification unit 109 also, when it is determined that the warning status has been acquired, subsequently performs specification of drone 20 at risk of collision with drone 20 for which the warning status is acquired, from among drones 20 determined to be performing irregular flight and in a non-control group, with priority over specification regarding drones 20 for which the warning status has not been acquired.

As described above, the determination processing and the specification processing regarding drone 20 for which the warning status has been acquired are preferentially performed, and thus, the specification processing by first collision specification unit 105 and the notification processing by flight irregularity notification unit 107 and collision notification unit 110 also are performed preferentially regarding drone 20 for which the warning status has been acquired. Each device included in operation management support system 1, based on the above configuration, performs priority processing that gives priority to various processing regarding drone 20 for which the warning status has been acquired. The priority processing will be described with reference to FIGS. 7 and 8.

Figure 7:
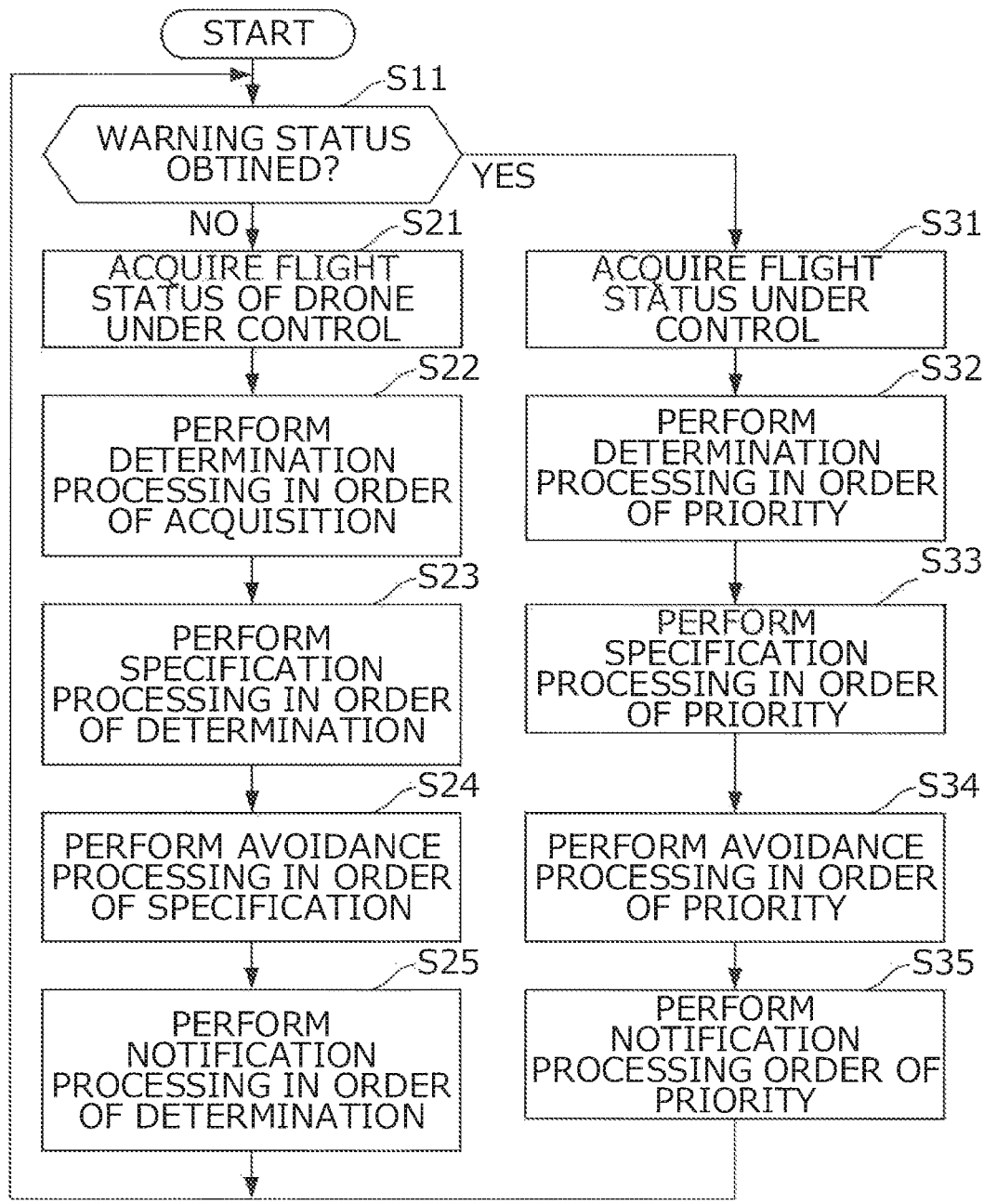
FIG. 7 is a diagram showing an example of an operation procedure of the server device in priority processing in accordance to the present invention.

FIG. 7 shows an example of an operation procedure of server device 10 in priority processing. In operation management support system 1, for example, each drone 20 transmits flight information at each of time intervals T1, and this operation procedure is performed at each of time intervals T1. First, server device 10 determines whether or not among drones 20 of the control group, there is some drone 20 for which the warning status has already been acquired, based on the specification results of first collision specification unit 105 (step S11).

Since the warning status has not been acquired at the beginning of the flight, server device 10 determines NO. In that case, server device 10 (flight information acquisition unit 102) respectively acquires the flight status indicated by the flight information transmitted from each drone 20 of the control group (step S21). Next, server device 10 (flight irregularity determination unit 103) performs determination processing that determines whether or not drone 20 in the control group is performing irregular flight, in the order in which the flight status is acquired (step S22).

In this example, it is assumed that there are a plurality of drones 20 determined to be performing irregular flight. In this case, server device 10 (first collision specification unit 105) performs specification processing that specifies drones 20 at risk of collision with those drones 20, in the order determined in step S22 (step S23). In this example, it is assumed that among drones 20 determined to be performing irregular flight, a plurality of drones 20 at risk of collision have been specified.

In this case, server device 10 (avoidance processing unit 106), in the order specified, performs avoidance processing regarding those drones 20 determined to be performing irregular flight and drones 20 specified to have a possibility of colliding in the control group (step S24). Also, server device 10 (flight irregularity notification unit 107), in the order determined in step S22, performs notification processing that gives notification of the flight status of drones 20 determined to be performing irregular flight (step S25).

Note that the operation of step S25 may be performed before or in parallel with steps S23 and S24. Then, server device 10 returns to step S11 and repeats the operation. When drone 20 at risk of collision has been specified in step S23, server device 10 determines in step S11 that the warning status has already been acquired (YES). In that case also, server device 10 (flight information acquisition unit 102) first respectively acquires the flight status indicated by the flight information transmitted from each drone 20 (step S31).

Next, server device 10 (flight irregularity determination unit 103) performs flight irregularity determination processing (determination processing in order of priority) by giving priority to drone 20 for which the warning status has been acquired (step S32). In this example, it is assumed that there are a plurality of drones 20 determined to be performing irregular flight. In this case, server device 10 (first collision specification unit 105) performs specification processing (specification processing in order of priority) that specifies drone 20 at risk of collision with that aerial vehicle, by giving priority to drone 20 for which the warning status is acquired among the plurality of drones 20 determined to be performing irregular flight (step S33).

In the following description, among drones 20 determined to be performing irregular flight in step S32, drones 20 at risk of collision with that aerial vehicle specified in step S33 means drones 20 in flight irregularity and at risk of collision. Server device 10 (avoidance processing unit 106) performs avoidance processing regarding drones 20 specified as being at risk of collision in step S33, and also performs the avoidance processing regarding drones 20 in flight irregularity and at risk of collision (step S34). Drones 20 regarding which the avoidance processing is performed in step S34 are all drones 20 belonging to the control group.

Because the specification processing is performed in priority order in step S33, this avoidance processing is performed by giving more priority to drones 20 for which the warning status is acquired and drones 20 specified as being at risk of collision with such drones 20 than to drones 20 for which the warning status has not yet been acquired and drones 20 specified as being at risk of collision with such drones 20. That is, the avoidance processing is performed in priority order also in step S34.

Next, server device 10 (flight irregularity notification unit 107), regarding each drone 20 determined to be performing irregular flight in step S32, performs flight status notification processing (notification processing in priority order) by giving priority to drones 20 for which the warning status is acquired (step S35). Note that the operation of step S35 may be performed before or in parallel with steps S33 and S34. Then, server device 10 returns to step S11 and repeats the operation.

As described above, in the operation procedure shown in FIG. 7, while there is no drone 20 specified as at risk of collision by the first collision specification unit 105, that is, drone 20 for which the warning status has been acquired, the operation of steps S21 to S25 is performed. However, when drone 20 for which the warning status has been acquired appears, the operation of steps S31 to S35 is performed in which processing related to that drone 20 is prioritized. Then, when drone 20 for which the warning status has been acquired is no longer present, the operation of steps S21 to S25 is performed again.

Figure 8:
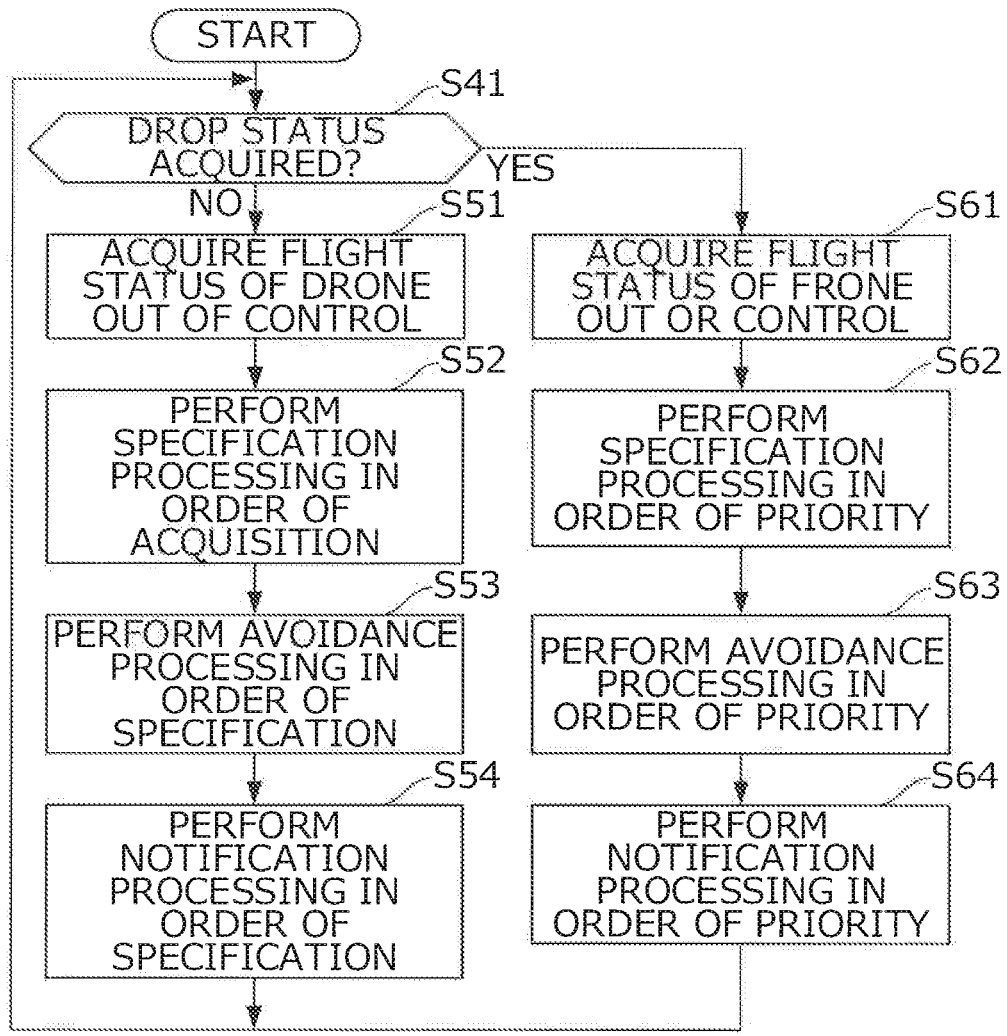
FIG. 8 is a diagram showing another example of an operation procedure of the server device in priority processing in accordance to the present invention.

Next, a case where the presence/absence of warning status acquisition is determined based on the specification results of second collision specification unit 109 will be described with reference to FIG. 8. FIG. 8 shows another example of an operation procedure of server device 10 in priority processing. First, server device 10 determines whether or not among drones 20 not under control (drones 20 performing irregular flight regarding which a notification is received from another server device 10), there is some drone 20 for which the warning status has already been acquired, based on the specification results of second collision specification unit 109 (step S41).

Since the warning status has not been acquired at the beginning of the flight, server device 10 determines NO. Next, server device 10 (flight irregularity determination unit 108) acquires the flight status of drone 20 not under control and performing irregular flight transmitted from another server device 10 (step S51). In this example, it is assumed that a plurality of flight status are acquired. In this case, server device 10 (second collision specification unit 109) performs specification processing that specifies drone 20 at risk of collision with those drones 20, in the order in which the flight status are acquired (step S52).

In this example, it is assumed that among drones 20 determined to be performing irregular flight and not under control, a plurality of drones 20 at risk of collision have been specified. In this case, server device 10 (avoidance processing unit 106) performs the avoidance processing, in the specified order, regarding drones 20 of the control group specified as being at risk of collision with those drones 20 (step S53).

Also, server device 10 (collision notification unit 110) performs notification processing that notifies other server devices 10 of the flight status of drones 20 specified as being at risk of collision, in the order identified in step S53 (step S54). Then, server device 10 returns to step S41 and repeats the operation. When drones 20 specified as being at risk of collision have been specified in step S52, server device 10 determines in step S41 that the warning status has already been acquired (YES).

In this case as well, server device 10 (irregularity notification receiving unit 108) acquires the flight status of drones 20 performing irregular flight and not under control transmitted from the other server device 10 (step S61). Next, server device 10 (second collision specification unit 109) performs specification processing (specification processing in order of priority) for drones 20 at risk of collision, by giving priority to drones 20 for which the warning status has been acquired (step S62).

In step S62, there are cases where drones 20 at risk of collision are specified even regarding drones 20 for which the warning status has not yet been acquired. On the other hand, there are cases where drones 20 at risk of collision cannot be specified even regarding drones 20 for which the warning status is acquired. In either of these cases, server device 10 (avoidance processing unit 106) performs avoidance processing regarding drones 20 of the control group specified as having the possibility of colliding (step S63).

Because the specification processing is performed in priority order in step S62, this avoidance processing is performed by giving more priority to drones 20 for which the warning status is acquired and drones 20 specified regarding those, than to drones 20 for which the warning status has not yet been acquired and specified regarding those. That is, the avoidance processing is performed in priority order also in step S63.

Note that drones 20 for which a notification is given that the flight status indicates flight irregularity is being performed are not under control, so the avoidance processing is performed by another server device 10. Also, server device 10 (collision notification unit 110) performs notification processing (notification processing in order of priority) for each drone 20 specified in step S62, by giving priority to drones 20 for which the warning status has been acquired (step S64). Then, server device 10 returns to step S41 and repeats operation.

As described above, in the operation procedure shown in FIG. 8, the operation of steps S51 to S54 is performed while drone 20 specified as being at risk of collision by the second collision specification unit 109, that is, drone 20 for which the warning status has been acquired, is not present. However, when drone 20 for which the warning status has been acquired appears, the operation of steps S61 to S64 in which the processing related to that drone 20 is given priority is performed. Then, when drone 20 for which the warning status has been acquired is no longer present, the operation of steps S51 to S54 is performed again.

In the present embodiment, as described above, processing based on the flight status acquired regarding drone 20 for which a flight status indicating that there is a possibility of crashing has been acquired is preferentially performed. By performing processing in the order of priority as described above, each type of processing is performed first for drone 20 at risk of crashing, even in a situation where the number of drones 20 increases and a processing delay occurs as described above.

As a result, even if a possibility of crashing occurs for drone 20, it is less likely that a situation will occur in which the avoidance processing is not in time for drone 20 at risk of crashing, in comparison to a case where the above-described priority is not used, and thus it is possible to easily avoid crashing of drone 20. It should be noted that, when specification processing or the like in a plurality of drones 20 is performed, it is also possible to allocate resources in a manner divided between server devices 10, and perform the processing in parallel.

With a method of dividing resources, processing is started earlier than in a case where the processing is performed in the order of acquisition of the flight information, but the resources used for the specification processing and the like in drone 20 at risk of crashing are reduced and time is needed for the processing. In the present embodiment, the order of the specification processing and the like in drone 20 at risk of crashing is set completely before other drones 20, and thus the avoidance processing can be performed earlier than in a case of performing parallel processing.

2. Modifications

The above-described embodiment is merely an example of implementation of the present invention, and may be modified as follows. In addition, the embodiments and the respective modifications may be combined as needed. In that case, the invention may be implemented by assigning a priority rank to each modification (by assigning a priority rank that decides which modification will be given priority when an event occurs that competes with each modification).

Further, as a specific combination method, for example, modifications in which different parameters are used to obtain a common index (for example, priority) may be combined to obtain a common index or the like using those parameters together. Also, one value may be obtained by adding together values indicating indexes or the like obtained individually according to some rule. Also, in those cases, different weighting may be assigned to each parameter used.

2-1. Method of Specifying Drones

First collision specification unit 105 and second collision specification unit 109 may specify drones 20 at risk of collision (a possibility of crashing) by a method different from that of the embodiment. For example, in the embodiment, when the distance between the position of drone 20 that is performing irregular flight and the current position of drone 20 in the flight plan is less than a threshold value, first collision specification unit 105 specifies this as drone 20 at risk of collision.

For example, first collision specification unit 105 may change the threshold value according to the positional relationship between drone 20 that is performing irregular flight and other drones 20, and the flight direction. Specifically, first collision specification unit 105 decreases the threshold value when the positions of both drones 20 are approaching each other, and increases the threshold value when the positions of both drones 20 are moving away from each other. Further, when the flight airspace is represented by cells as in the embodiment, the cells may be utilized for performing specification.

For example, a configuration may be adopted in which first collision specification unit 105 predicts a flight path for a certain period in the future from the flight direction of drone 20 that is performing irregular flight, and drone 20 with planned flight through a cell where the distance from drone 20 that is performing irregular flight is less than the threshold value in that period is specified as drone 20 at risk of collision. Also, for example, a cell including a position in three-dimensional space indicated by the flight position and flight altitude included in the flight status of drone 20 indicates in-flight airspace of that drone 20.

Therefore, drone 20 regarding which a flight plan has been acquired to fly through airspace having a predetermined relationship with the airspace in which drone 20 that is performing irregular flight is currently flying may be specified as drone 20 at risk of collision by first collision specification unit 105. The predetermined relationship is, for example, a relationship with the same airspace as the current in-flight airspace. This is because drones 20 flying in the same airspace have a possibility of colliding with each other.

Note that, in addition, for example, a relationship with the same airspace as the current in-flight airspace of drone 20 that is performing irregular flight or airspace adjacent thereto may be used as the predetermined relationship. Also, when the flight direction of drone 20 is limited, such as in a flight path for transportation, airspaces adjacent to each other only toward the front or rear in the flight direction may be included in the airspaces having a predetermined relationship. By performing specification based on the cells (flight airspaces) in this way, processing to calculate the distance between drones 20 becomes unnecessary.

It is easier to reduce the processing load by determining whether or not coordinates are included in a cell (whether or not coordinates are within a predetermined range) than by calculating the distance between three-dimensional coordinates. Therefore, according to the present modification, the processing load when specifying drone 20 at risk of collision can be reduced compared to a case where specification is based on the distance between drones 20.

On the other hand, although the possibility of collision varies depending on where in a cell an aerial vehicle flies, a detailed collision possibility cannot be determined on a cell-by-cell basis. When the distance between drones 20 is used as in the embodiment, drone 20 at risk of collision can be specified with higher accuracy than in a case where the possibility of collision is determined on a cell-by-cell basis.

Also, second collision specification unit 109 may use the same specification method as first collision specification unit 105 described above. For example, when notification has been given of the flight status of drone 20 performing irregular flight and belonging to a non-control group, as drone 20 at risk of collision, second collision specification unit 109 specifies drone 20 belonging to an interval group for which a flight plan is acquired to fly through airspace having a predetermined relationship with the in-flight airspace of that drone 20 performing irregular flight.

The concept of the predetermined relationship is as described above. In this case as well, the processing (specification processing) load when specifying drone 20 at risk of collision can be reduced compared to a case where specification is based on the distance between drones 20. Also, when the distance between drones 20 is used as in the embodiment, drone 20 at risk of collision can be specified with higher accuracy than in a case where the possibility of collision is determined on a cell-by-cell basis.

Also, other than the method described above, first collision specification unit 105 and second collision specification unit 109 may, for example, perform specification based not only on the relationship between two drones 20, but also on the relationship with other drones 20. For example, in a case where the number of in-flight drones 20 (the density of drones 20) flying in the same flight airspace as drone 20 performing irregular flight is at least a threshold value, first collision specification unit 105 and second collision specification unit 109 may specify those other drones 20 as drones 20 at risk of collision. In this case as well, calculation of distance is not necessary, so the processing load can be reduced.

Also, other than the method described above, first collision specification unit 105 and second collision specification unit 109 may, for example, specify drones 20 at risk of collision based on the flight direction or the flight speed of drones 20. In this case, for example, even if the distance between drones 20 is the same, if their flight directions are directed towards each other, there is a higher possibility of colliding than if their flight directions are directed away from each other, so such drones 20 are specified as being at risk of collision.

Specifically, for example, first collision specification unit 105 specifies drone 20 at risk of collision by setting the threshold value of the distance between drones 20 whose flight directions are directed towards each other (a distance of less than the threshold value indicates that there is a possibility of colliding) to larger than the threshold value of the distance between drones 20 whose flight directions are directed away from each other. Also, first collision specification unit 105 increases the threshold value of the distance between drones 20 as the flight speed increases. Second collision specification unit 109 can specify drone 20 at risk of collision by a similar method. In both cases, the accuracy of specifying drone 20 at risk of collision can be improved in comparison to a case where the flight direction or the flight speed is not used.

2-2. Flight Information

The flight status indicated by the flight information transmitted by drone 20 may be different from that in the embodiment. For example, since the flight direction and the flight speed can be calculated from the amount of change of the flight position and the flight altitude, the flight information does not have to include the flight direction and the flight speed. Further, for example, if it is decided to fly at a certain flight altitude in a certain area, the flight information does not need to include the flight altitude.

Also, when drone 20 has a function of detecting the distance and direction of aerial vehicle in the vicinity (mainly other drones 20), flight information indicating a flight status that an aerial vehicle exists at the detected distance and direction may be acquired. This flight status can also be used to determine the possibility of collision between drones 20. In other words, any information may be included in the flight information as long as it can be utilized for at least one of determining flight irregularity and determining the possibility of collision between drones 20.

2-3. Multi-Level Priority: Distance Between Drones

In the embodiment, only the presence/absence of priority is determined depending on whether or not a flight status indicating the possibility of crashing is acquired, but the priority may be determined more finely and step-wise. In this modification, when the acquired flight status indicates the distance from other drones 20, and the possibility of crashing is indicated by that distance, flight status processing unit 112 sets a higher priority as that distance decreases.

Flight status processing unit 112, for example, determines this priority using a priority table in which the distance between drones 20 and the priority are associated with each other. FIG. 9 shows an example of a priority table. In the example shown in FIG. 9, distances between drones 20, namely "less than Th11", "at least Th11 and less than Th12", and "at least Th12 and less than Th13" (Th11<Th12<Th13), and priorities of "high", "medium", and "low" are respectively associated with each other.

Note that in a case where the distance between drones 20 is at least Th13, since this is not specified as drone 20 at risk of collision, a priority is not assigned. First collision specification unit 105 and second collision specification unit 109 calculate the distance between drone 20 that is performing irregular flight and other drones 20 as described in the embodiment. For example, flight irregularity determination unit 103 reads the priority associated with the calculated distance between drones 20 in the priority table, and executes the determination processing in order from the higher priority that is read.

Second collision specification unit 109 also reads the priority associated with the calculated distance between drones 20 in the priority table, and executes the specification processing in order from the higher priority that is read. Further, since upstream processing is performed in the order of priority, first collision specification unit 105, flight irregularity notification unit 107, and collision notification unit 110 similarly perform specification processing or notification processing respectively beginning from drone 20 having the higher priority.

Note that in a case where the priorities are the same, the processing may be performed in the order of acquisition of the flight status, in the order of the previous priority (going back until a difference in priority appears), or in a randomly determined order or the like. Further, the priority shown in FIG. 9 is only an example, and two stage of priority may be used, or four stages or more of priority may be used. Also, for example, the priority may be expressed steplessly by numerical values from "0" indicating the lowest priority to "1" indicating the highest priority. In other words, a priority represented in any manner may be used as long as the priority ranking for performing processing can be determined. The same is also true for subsequent priorities.

The closer the distance between drones 20, the higher the possibility of a collision, and the higher the possibility of crashing. In this modification, each type of processing is executed with the Multi-Level Priority according to the distance between drones 20 as described above, so a processing delay is less likely to occur for drone 20 having a higher possibility of crashing than in a case where this priority is not used. In this way, it is less likely that a situation will occur in which the avoidance processing is not in time.

2-4. Multi-Level Priority: Time Until Collision

The method of deciding the Multi-Level Priority is not limited to the method of deciding in the above modification. In this modification, when the time at which the collision with another drone 20 that causes a crash is predicted is indicated by the acquired flight status, flight status processing unit 112 sets the priority higher as the time interval until the predicted time is shorter. The predicted time of collision of drones 20 can be calculated based on the flight position, flight time, flight direction and flight speed of each drone 20.

Calculation of the predicted time is performed by first collision specification unit 105 and second collision specification unit 109, for example, based on each item of the above-described information included in the flight status. Note that even if the flight status does not include the flight direction and the flight speed, the predicted time can be calculated by obtaining the flight direction and the flight speed from the time interval change of the flight position. Flight status processing unit 112 including both specification units determines priority by using, for example, a priority table in which the time interval until the predicted time (predicted time interval until collision) and priority are associated with each other.

FIG. 10 shows an example of a priority table of this modification. In the example shown in FIG. 10, predicted time intervals until collision, namely "less than Th21", "at least Th21 and less than Th22", and "at least Th22 and less than Th23" (Th21<Th22<Th23), and priorities of "high", "medium", and "low" are respectively associated with each other. Note that in a case where the predicted time interval until collision is at least Th23, since this is not specified as drone 20 at risk of collision, a priority is not assigned.

For example, flight irregularity determination unit 103 reads the priority associated with the calculated time intervals until collision in the priority table, and executes the determination processing in an order that conforms to the read priority. Further, first collision specification unit 105, flight irregularity notification unit 107, second collision specification unit 109, and collision notification unit 110, as described in the above modification, perform specification processing or notification processing respectively beginning from drone 20 having the higher priority.

The shorter the predicted time interval until collision is, the higher the possibility of a collision, and the higher the possibility of crashing, and as described the time interval until a collision is shorter. Therefore, there is a greater possibility that a processing delay will occur and thus that a collision cannot be avoided. In this modification, as described above, each type of processing is executed with the Multi-Level Priority according to the predicted time interval until collision, so a processing delay is less likely to occur for drone 20 having a shorter time interval until collision than in a case where this priority is not used. In this way, it is less likely that a situation will occur in which the avoidance processing is not in time.

2-5. Multi-Level Priority: Crash Range

The method of deciding the Multi-Level Priority is not limited to the method of deciding in the above modification. In this modification, when a range (predicted crash range) in which drone 20 has a possibility of crashing is indicated by the acquired flight status, flight status processing unit 112 sets a higher priority as the predicted crash range increases. The predicted crash range of drone 20 can be calculated based on the flight position, flight time, flight altitude, flight direction, and flight speed of each drone 20.

The predicted crash range is calculated, for example, by first collision specification unit 105 and second collision specification unit 109 based on each item of the above-described information included in the flight status. For example, second collision specification unit 109 calculates a position with a high possibility of collision based on the flight position, the flight time, the flight direction, and the flight speed. Second collision specification unit 109 calculates the flight altitude at the position where the collision is predicted to occur (collision prediction position) from the transition of the flight altitude, and calculates the range of positions possibly reached by drone 20 when crashing from the collision prediction position.

Second collision specification unit 109, for example, assuming the crash range has the shape of a cone in which the collision position is the vertex and the apex angle is a predetermined angle (for example, 45 degrees), calculates a circular range where the cone intersects the ground as the predicted crash range. Note that second collision specification unit 109 may also calculate the predicted crash range by using a shape obtained by deforming the cone by a ratio according to the flight speed in the flight direction of drone 20 (such that the portion that intersects with the ground has the shape of a cone).

Flight status processing unit 112, for example, determines priority using a priority table in which areas of the predicted crash range and priorities are associated with each other. FIG. 11 shows an example of a priority table of this modification. In the example shown in FIG. 11, areas of the predicted crash range, namely "less than Th31", "at least Th31 and less than Th32", and "at least Th32" (Th31<Th32), and priorities of "low", "medium", and "high" are respectively associated with each other.

For example, flight irregularity determination unit 103 reads the priority associated with the calculated predicted crash range areas in the priority table, and executes the determination processing in order from the higher priority that is read. Further, first collision specification unit 105, flight irregularity notification unit 107, second collision specification unit 109, and collision notification unit 110, as described in the above modification, perform specification processing or notification processing respectively beginning from drone 20 having the higher priority.

Even if drone 20 does crash, drone 20 often flies over a place where damage is relatively small. However, the larger the predicted crash range is, the higher the possibility of crashing in a place where the damage is large. In this modification, as described above, each type of processing is executed with the Multi-Level Priority according to the predicted crash range, so a processing delay is less likely to occur for drone 20 having a greater possibility of large damage when a crashing occurs than in a case where this priority is not used, and thus avoidance can be performed on time. In this way, even if drone 20 does crash, it is possible for damage to be small.

2-6. Multi-Level Priority: Expected Damage

The method of deciding the Multi-Level Priority is not limited to the method of deciding in the above modification. In this modification, for example, flight information acquisition unit 102 acquires ground information, which is information indicating the population density of the ground in the vicinity of drone 20 in flight.

The population density is expressed, for example, according to the type of land on the ground. The type of land is, for example, a type in which land is classified according to use, such as residential land, commercial land, industrial land, agricultural land, forest land, and the like. For example, the type of land indicates the tendency for a large number of people to be present there, such as the fact that there are many people in a residential land area and few people in a forest land area. Noted that the time interval for allowing flight of drones 20 is basically in the daytime, so risk level information may represent the number of people during the daytime.

In this modification, server device 10 stores in advance map data representing a map of an area where flights are planned by flight plans and the type of land in that area. For classification of land types, for example, registered landmarks may be used, or color coding (color coding of houses, shops, factories, and the like) applied on a commercially available map may be used.

Flight information acquisition unit 102 specifies the position on the map of the flight position indicated by the acquired flight status, and acquires the type of land in the vicinity of the specified position from the map data as ground information. Flight information acquisition unit 102 supplies the acquired ground information to flight status processing unit 112. Flight status processing unit 112 increases the priority as the population density indicated by the ground information acquired regarding drone 20 for which a possibility of crashing is indicated by the acquired flight status increases.

Flight status processing unit 112, for example, determines priority using a priority table in which types of land on the ground, population density, and priority are associated with each other. FIG. 12 shows an example of a priority table of this modification. In the example shown in FIG. 12, types of land, namely "agricultural land or forest land", "industrial land" and "residential land and or commercial land", population densities of "low", "medium", and "high", and priorities of "low", "medium", and "high" are respectively associated with each other.

For example, flight irregularity determination unit 103 reads the priority associated with the same population density in the priority table as the acquired ground information, and executes the determination processing in order from the higher priority that is read. For example, if there is drone 20 whose ground information indicates "industrial land" and drone 20 whose ground information indicates "residential land", the latter has priority "high" and the former has priority "medium", so flight irregularity determination unit 103 performs determination processing is performed in order beginning with the latter drone 20.

Further, first collision specification unit 105, flight irregularity notification unit 107, second collision specification unit 109, and collision notification unit 110, as described in the above modification, perform specification processing or notification processing respectively beginning from drone 20 having the higher priority. In this modification, as described above, each type of processing is executed with the Multi-Level Priority according to the population density on the ground, so a processing delay is less likely to occur for drone 20 having a greater possibility of large damage when a crash occurs than in a case where this priority is not used, and thus avoidance can be performed on time. In this way, even if drone 20 does crash, it is possible for damage to be small.

Therefore, the population density is only an index of the degree of damage (scale and severity) predicted when a crash occurs, and other indexes may also be used. For example, when an important facility (for example, an infrastructure facility) exists at the expected crashing point, the priority may be set higher than the priority for a residential land area.

2-7. Multi-Level Priority: Weather Conditions

The method of deciding the Multi-Level Priority is not limited to the method of deciding in the above modification. In this modification, for example, flight information acquisition unit 102 acquires the weather conditions in the vicinity of in-flight drones 20. Since drones 20 are easily affected by wind and rain, the risk of crashing increases as the wind speed and precipitation amount increase.

In this modification, flight information acquisition unit 102 acquires weather information using a weather forecast service or the like to acquire weather conditions indicated by the weather information. Flight information acquisition unit 102 supplies the acquired flight status to flight status processing unit 112. Flight status processing unit 112 increases the priority as the weather conditions acquired regarding drone 20 for which the acquired flight status indicates that there is a possibility of crashing make flight more difficult.

Flight status processing unit 112, for example, determines priority using a priority table in which weather conditions and priority are associated with each other.

FIG. 13 shows an example of priority tables of this modification. In the example shown in FIG. 13A, wind speeds, namely "less than Th41", "at least Th41 and less than Th42", and "at least Th42" (Th41<Th42), and priorities of "low", "medium", and "high" are respectively associated with each other.

In the example shown in FIG. 13B, precipitation amounts, namely "less than Th51", "at least Th51 and less than Th52", and "at least Th52" (Th51<Th52), and priorities of "low", "medium", and "high" are respectively associated with each other. For example, flight irregularity determination unit 103 reads the priority associated in the priority table with the wind speed acquired as the weather conditions, and executes the determination processing in order from the higher priority that is read.

Note that the weather conditions are not limited to the above wind speed and precipitation amount, and, for example, the snowfall amount and the temperature (when the temperature is extremely high or extremely low, the performance of the hardware decreases and the possibility of crashing increases) or the like may also be used. In this modification, as described above, each type of processing is executed with the Multi-Level Priority according to the weather conditions, so a processing delay is less likely to occur for drone 20 with a status such that a risk of crashing increase due to weather conditions, in comparison to a case where this priority is not used. Thus, avoidance processing can be performed on time.

2-8. Control Under Priority

In the embodiment, flight status processing unit 112 executes processing with high priority before processing with low priority, but the processing method according to priority is not limited to this. For example, flight status processing unit 112 may repeatedly execute processing based on the flight status, and when a delay occurs in processing for which the priority is high, cancel processing for which the priority is low to eliminate the delay.

For example, flight irregularity determination unit 103 performs determination processing, specification processing, notification processing, and the like at each time interval T1, but when the number of drones 20 increases, a situation may occur in which all processing is not ended during time interval T1. In particular, if the number of drones 20 that are performing irregular flight increases, specification processing and notification processing also increase, so this situation easily occurs. In this case, even if processing with a high priority ends and processing with a low priority is started, flight irregularity determination unit 103 ends that processing when the time interval T1 has elapsed, and starts the next processing with high priority.

Also, when the processing with high priority does not end during time interval T1, flight irregularity determination unit 103 starts the next processing with high priority without performing processing with low priority, and does not perform processing with low priority until the processing amount decreases and fits within time interval T1. Note that a configuration may also be adopted in which, when using a Multi-Level Priority as in the above modification, flight irregularity determination unit 103 ends processing with low priority that does not fit within time interval T1 even in the midst of that processing, and starts the next processing with high priority.

In this modification, it is possible to more reliably prevent a delay in processing having a high priority compared to a case where the above cancellation is not performed. Note that, other than the above method, for example, flight status processing unit 112 may execute processing for which the priority is low in a more simplified manner than processing for which the priority is high. For example, in specification processing having high priority, second collision specification unit 109 performs specification by the method described in the embodiment, in which the distance between drones 20 is calculated.

Also, in specification processing having low priority, second collision specification unit 109 performs specification by the method described in the above modification, in which the relationship of flight airspace where drones 20 fly, or the density of drones 20, is used. In this case, in processing having high priority, it is possible to obtain specification results with high precision, and in processing having low priority, the processing load is reduced, so the time needed for processing overall is shortened, and therefore a delay in processing having high priority is less likely to occur.

2-9. Possibility of Crash

In the embodiment, as the warning status (the flight status indicating that there is a possibility of crashing for drone 20), a flight status indicating the possibility of contact with another drone 20 is used, but this is not a limitation. For example, a status in which drone 20 is gradually crashing due to a component failure or exhausted battery or the like, regardless of other drones 20, also indicates the possibility of crashing.

Therefore, flight status processing unit 112 may determine there to be warning status when the difference between the flight altitude of the flight plan and the actual flight altitude continuously increases for a predetermined number of times. Further, flight status processing unit 112 may determine warning status by using the difference in flight speed in the same manner. Also, although flight performance is not a problem, a status in which operation instructions from the propo or the like are not accepted also indicates a possibility of crashing.

In that case, flight status processing unit 112 may determine there to be warning status when, for example, flight continues on a route that is not in the flight plan for at least a certain amount of time in a straight line (when flight is performed in a state in which new operation instructions are not given). In other words, any flight status may be used for determining there to be warning status, as long as this flight status indicates that there is a possibility of crashing instead of a normal flight status indicating flight according to the flight plan.

2-10. Narrowing Down Notification Destinations

In the embodiment, flight irregularity notification unit 107 gives notification of the flight status of drones 20 performing irregular flight to all other server devices 10, but the notification destinations may be narrowed down. Flight irregularity notification unit 107, for example, may narrow down the notification destinations to only server devices 10 that have jurisdiction over drone 20 that is performing irregular flight and drone 20 that is specified as being at risk of collision. By doing so, it is possible to reduce the load of processing (communications processing, specification processing, and the like) due to giving notification of drone 20 that is performing irregular flight, as compared to a case where no narrowing is performed.

2-11. Flight Plans

The method of expressing flight plans may be different from that in the embodiment. For example, a flight plan may be expressed using coordinates in a three-dimensional space without using cells. In that case, for example, in a three-dimensional coordinate system, a mathematical expression expressing the flight path as a line, a mathematical expression expressing a boundary plane of the flight airspace, or the like may be used. In addition, a flight plan may be represented only by information regarding a departure point, waypoints, and an arrival point, instead of the route along the way. Even in that case, if it is decided to move along a straight line between each position or to move along a predetermined route, it is possible to determine the route of actual flight.

Also, although it is desirable that a detailed flight period is known for the planned flight period, it may be sufficient to know only the planned departure time and the planned arrival time, for example. In that case as well, for example, by calculating the average flight speed, it is possible to determine the time and area in which flight will occur. In other words, the flight plan may be expressed in any form as long as it is possible to determine flight irregularity by matching the flight plan with flight information.

2-12. Aerial Vehicle

In the embodiment, a rotary blade-type flying body is used as a flying body that performs autonomous flight, but this is not a limitation. For example, the flying body may be a flying body such as an aerial vehicle or a helicopter. In other words, any flying body that can fly by operation by an operator and has a function of acquiring inspection data may be used.

2-13. Devices Realizing Each Function

The devices realizing each function shown in FIG. 4 are not limited to the above-described devices. For example, integrated management device 30 may realize some of the functions realized by server device 10. Further, for example, when the business that manages drone is small and there are a few drones 20 under its control, a device used by an operator such as a propo or a personal computer may realize each function of server device 10. In other words, it is sufficient that each function shown in FIG. 4 is realized in the operation management support system 1 as a whole.

2-14. Output of Execution Results

Flight status processing unit 112 such as flight irregularity determination unit 103 outputs the results of respective processing, but the method of that output may differ from that of the embodiment. For example, in the embodiment, avoidance processing unit 106 outputs (transmits) instruction data indicating instructions for avoiding danger to drone 20, the propo, the personal computer, or the like, but for example, the instruction data may be output to a display means such as a display or a printing means such as a printer.

Also, avoidance processing unit 106 may output the instruction data to a smartphone used by an operator, or may output the instruction data to an e-mail address of the operator. Further, the output (transmission) destination of the information given in notifications by flight irregularity notification unit 107 and collision notification unit 110 is not limited to server device 10, and may be a propo, a personal computer, a display, a printer, or the like. In that case, the flight status of drone 20 that performs irregularity flight and drone 20 at risk of collision can be transmitted to a user.

Also, the results of processing by flight irregularity determination unit 103, first collision specification unit 105, second collision specification unit 109, flight irregularity notification unit 107, and collision notification unit 110 may be represented in the instruction data output by avoidance processing unit 106. By doing so, the results of processing by each unit can be collectively transmitted to the user. In either case, the results of processing by flight status processing unit 112 may be output in order to perform other processing by server device 10, or may be output in order to transmit the content of the results to the user, or may be output for both of those purposes.

2-15. Category of the Invention

The present invention may be understood as, other than information processing apparatuses of above server device 10 and integrated management device 30, an information processing system (operation management support system 1) including those information processing apparatuses and aerial vehicle such as drone 20. The present invention can also be understood as an information processing method for realizing the processing implemented by those information processing apparatuses, or as a program for causing a computer to control those information processing apparatuses. The program may be provided in the form of a recording medium such as an optical disk where the program is stored, or may be provided by being downloaded to a computer over a network such as the Internet and installed so as to be usable on that computer.

2-16. Processing Blocks

Note that the block diagram used in the description of the above embodiment shows blocks of functional units. These function blocks (constituent units) are realized by any combination of at least one of hardware and software. The method of realizing each function block is not particularly limited.

That is, each functional block may be realized by using one device physically or logically coupled, or may be realized by directly or indirectly connecting two or more devices that are physically or logically separated (using, for example, a wired connection, a wireless connection, or the like), and using the plurality of these devices. Function blocks may also be realized by combining the one device or the plurality of devices with software.

Examples of functions include determining, deciding, summing, calculating, processing, deriving, surveying, searching, confirming, receiving, transmitting, outputting, accessing, solving, selecting, setting, establishing, comparing, assuming, expecting, considering, broadcasting, notifying, communicating, forwarding, configuring, reconfiguring, allocating, mapping, assigning, and the like, but these are not limitations. For example, a functional block (constituent unit) that causes transmission to function is called a transmission unit or a transmitter (transmitter). In any case, as described above, the method of realizing a function is not particularly limited.

2-17. Handling of Input/Output Information and the Like

Information and the like that has been input/output may be saved in a specific location (for example, a memory), or may be managed using a management table. The information and the like that is input/output can be overwritten, updated, or added to. Information and the like that has been output may be deleted. Information and the like that has been input may be transmitted to another device.

2-18. Determination Method

Determination may be performed according to a value (0 or 1) represented by 1 bit, or may be performed according to a Boolean value (Boolean: true or false), or may be performed by comparing numerical values (for example, comparison with a predetermined value).

2-19. Processing Sequences and the Like

The processing sequences, procedures, flowcharts, and the like of the embodiments described in this disclosure may be carried out in different orders as long as doing so does not create conflict. For example, in the methods described in the present disclosure, the elements of a variety of steps are presented in an order given as an example, and the order is not limited to the specific order presented here.

2-20. Handling of Input/Output Information and the Like

Information and the like that has been input/output may be saved in a specific location (for example, a memory), or may be managed using a management table. The information and the like that is input/output can be overwritten, updated, or added to. Information and the like that has been output may be deleted. Information and the like that has been input may be transmitted to another device.

2-21. Software

Regardless of whether software is referred to as software, firmware, middleware, microcode, hardware description language, or by another name, "software" should be interpreted broadly as meaning commands, command sets, code, code segments, program code, programs, sub programs, software modules, applications, software applications, software packages, routines, subroutines, objects, executable files, execution threads, sequences, functions, and the like.

Additionally, software, commands, and the like may be exchanged over a transmission medium. For example, when software is transmitted from a website, a server, or another remote source using hardwired technologies such as coaxial cable, fiber optic cable, twisted pair cabling, or digital subscriber line (DSL), and/or wireless technologies such as infrared light, radio waves, or microwaves, at least one of these hardwired technologies and wireless technologies is included in the definition of "transmission medium".

2-22. Information and Signals

The information, signals, and the like described in the present disclosure may be expressed using any of a variety of different techniques. For example, data, instructions, commands, information, signals, bits, symbols, chips, and the like that may be referred to throughout all of the foregoing descriptions may be expressed by voltages, currents, electromagnetic waves, magnetic fields or magnetic particles, photo fields or photons, or any desired combination thereof.

2-23. Term "Determine"

The term "determine" as used in this disclosure may encompass a wide variety of actions. For example, performing any action of determining, calculating, computing, processing, deriving, investigating, looking up, searching, inquiring (for example, searching in a table, a database, or another data structure), ascertaining or the like may be considered as performing an action of "determining".

Also, for example, performing any action of receiving (for example, receiving information), transmitting (for example, transmitting information), input, output, accessing (for example, accessing data in memory) or the like may be considered as performing an action of "determining". Also, performing any action of resolving, selecting, choosing, establishing, comparing, or the like may be considered as performing an action of "determining". That is, performing some action may be considered as performing an action of "determining". Also, the term "determining" may be replaced with "assuming", "expecting", "considering", or the like.

2-24. Meaning of "Based On"

The phrase "based on" used in the present disclosure does not mean "based only on" unless specifically mentioned. In other words, the phrase "based on" means both "based only on" and "based at least on".

2-25. Term "Different"

In the present disclosure, the phrase "A and B are different" may mean "A and B are different from each other". This phrase may mean that "A and B are each different from C". Terms such as "away" and "coupled" may be construed in a similar manner as "different".

2-26. Terms "And" and "Or"

In the present disclosure, with respect to configurations that can be realized both as "A and B" and "A or B", a configuration described using one of these phrases may be used as a configuration described by the other of these phrases. For example, if the phrase "A and B" is used, "A or B" may be used as long as implementation is possible without conflicting with the other phrase.

2-27. Variations and the Like of Embodiments

The embodiments described in the present disclosure may be used alone, may be combined, or may be switched according to how the invention is to be carried out. Additionally, notifications of predetermined information (for example, a notification that "X is true") are not limited to explicit notifications, and may be carried out implicitly (for example, the notification of the predetermined information is not carried out).

Although the foregoing has described the present disclosure in detail, it will be clear to one skilled in the art that the present disclosure is not intended to be limited to the embodiments described in the present disclosure. The present disclosure can be carried out in modified and altered forms without departing from the gist and scope of the present disclosure set forth in the appended scope of patent claims. As such, the descriptions in the present disclosure are provided for illustrative purposes only, and are not intended to limit the present disclosure in any way.

REFERENCE SIGNS LIST

1 . . . Operation management support system
10 . . . Server device
20 . . . Drone
30 . . . Integrated management device
101 . . . Flight plan transmission unit
102 . . . Flight information acquisition unit
103 . . . Flight irregularity determination unit
104 . . . Flight plan acquisition unit
105 . . . First collision specification unit
106 . . . Avoidance processing unit
107 . . . Flight irregularity notification unit
108 . . . Irregularity notification receiving unit
109 . . . Second collision specification unit
110 . . . Collision notification unit
111 . . . Collision notification receiving unit
201 . . . Flight control unit
202 . . . Flight information transmission unit
301 . . . Flight plan acquisition unit
302 . . . Flight plan storage unit
303 . . . Flight plan distribution unit

The invention claimed is:

1. An information processing apparatus comprising:
an acquisition unit configured to acquire flight statuses for a plurality of aerial vehicles in flight repeatedly; and
an output unit configured to execute processing based on the acquired flight statuses and outputs results of the processing, wherein
upon acquisition of a flight status that indicates a possibility of a crash of one of the plurality of aerial vehicles in flight, the output unit executes processing for the flight status of the one of the plurality of aerial vehicles in flight with a higher priority than processing performed for flight statuses acquired for other of the plurality of aerial vehicles in flight; and
wherein when a delay occurs in processing for which the processing priority is higher, the output unit cancels processing for which the processing priority is lower to recover the delay.

2. The information processing apparatus according to claim 1, wherein when the flight status acquired for the one of the plurality of aerial vehicles in flight includes a distance to another of the plurality of aerial vehicles in flight, and a possibility of the crash is defined by the distance, the output unit sets a processing priority higher as the distance becomes shorter.

3. The information processing apparatus according to claim 1, wherein when the flight status acquired for the one of the plurality of aerial vehicles in flight includes an estimated time to a collide with the another of the plurality of the aerial vehicles in flight, the output unit sets the processing priority higher as the estimated time becomes shorter.

4. The information processing apparatus according to claim 1, wherein when the flight status acquired for the one of the plurality of aerial vehicles in flight includes an area in which the one of the plurality of aerial vehicles in flight is expected to crash, the output unit sets the processing priority higher as the area becomes larger.

5. The information processing apparatus according to claim 1, wherein
the acquisition unit acquires ground information that indicates a population density on the ground in a vicinity of the plurality of aerial vehicles in flight, and
when the ground information acquired for the one of the plurality of aerial vehicles in flight indicates an increase in the population density on the ground the output unit sets the processing priority higher.

6. The information processing apparatus according to claim 1, wherein:
the acquisition unit acquires weather conditions for vicinities of the plurality of aerial vehicles in flight, and
when a weather condition acquired for a vicinity of the one of the plurality of aerial vehicles in flight is inclement to flight, the output unit sets the processing priority higher.

7. The information processing apparatus according to claim 1, wherein the output unit executes processing for which the processing priority is higher before executing processing for which a processing priority is lower.

8. The information processing apparatus according to claim 1, wherein the output unit executes processing for the priority that is lower in a simpler manner than processing executed for the priority that is higher.

* * * * *